United States Patent Office 3,018,290
Patented Jan. 23, 1962

3,018,290
PREPARATION OF MALEIMIDES
Carol K. Sauers, Middlebush, and Robert J. Cotter, New Brunswick, N.J., assignors to Union Carbide Corporation, a corporation of New York
No Drawing. Filed Nov. 12, 1959, Ser. No. 852,236
10 Claims. (260—326.3)

This invention relates to the preparation of maleimides. More particularly, this invention relates to the preparation of N-substituted maleimides by the cyclodehydration of the corresponding maleamic acids.

The preparation of maleimides has been accomplished, generally, by the cyclodehydration of the corresponding maleamic acids by heating a mixture of the desired maleamic acid, acetic anhydride, and either potassium or sodium acetate at a temperature of about 80° C. with the result that the maleamic acid is dehydrated, yielding the corresponding maleamide. This method, although satisfactory for the preparation of N-aryl substituted maleimides, such as N-phenyl maleimide, is not satisfactory for the preparation of N-aliphatic substituted maleimides, such as N-n-butyl maleimide. N-aliphatic substituted maleimides prepared by such a process has been low in yield and usually contain large quantities of undesirable resinous by-products.

The present invention provides for the preparation of N-substituted maleimides, including N-aliphatic substituted maleimides, in satisfactory yields and without the substantial formation of undesirable resinous by-products by admixing an N-substituted maleamic acid, an organic tertiary amine, and an anhydride of a lower fatty acid, i.e., a saturated acid having a maximum of four carbon atoms, whereby the N-substituted maleamic acid is cyclodehydrated to the corresponding maleimide.

Illustrative of N-substituted maleamic acids which can be cyclodehydrated in accordance with the present invention are those having the general formula:

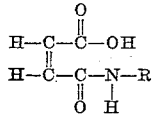

in which R is a monovalent hydrocarbon radical or a divalent hydrocarbon radical having as a substituent on its terminal carbon atom a radical having the formula:

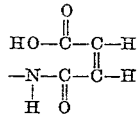

These latter N-substituted maleamic acids are commonly referred to as bis-maleamic acids.

The term "monovalent hydrocarbon radical" as used herein is intended to encompass unsubstituted hydrocarbon radicals as well as substituted hydrocarbon radicals.

Exemplary of such radicals are alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated alkyl and cycloalkyl radicals, such as allyl, cyclopentenyl, and the like; halogenated alkyl and cycloalkyl radicals, such as chloromethyl, bromomethyl, fluoromethyl, 2-chloro-n-propyl, 2-bromo-n-propyl, 2-chloro-n-butyl, 3-chloro-n-amyl, 3-bromo-n-amyl, 1-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxycyclohexyl, and the like; aralkyl radicals, such as benzyl, 2-phenylethyl, 3-phenyl-n-propyl, 1-phenyl-n-butyl, 1-phenyl-n-docesyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl, p-ethoxyphenyl, p-n-propoxyphenyl, and the like; alkaryl radicals, such as p-methylphenyl, p-ethylphenyl, p-n-propylphenyl, o-n-propylphenyl, o-n-butylphenyl, p-n-dodecylphenyl, p-(2-ethyl-n-hexyl) phenyl, and the like; nitro substituted aryl radicals, such as p-nitrophenyl, 2-nitronaphthyl, and the like; other suitable radicals include 4-hydroxynaphthyl, and the like.

Representative of maleamic acids wherein R in the general formula previously given is a monovalent hydrocarbon radical are N-methyl maleamic acid, N-ethyl maleamic acid, N-n-propyl maleamic acid, N-allyl maleamic acid, N-n-butyl maleamic acid, N-tertiary butyl maleamic acid, N-n-hexyl maleamic acid, N-(2-ethyl-n-hexyl) maleamic acid, N-n-heptyl maleamic acid, N-n-nonyl maleamic acid, N-n-dodecyl maleamic acid, N-n-decosyl maleamic acid, N-cyclohexyl maleamic acid, N-(2-chloroethyl) maleamic acid, N-(2-bromoethyl) maleamic acid, N-(2-fluoroethyl) maleamic acid, N-(2-iodo-n-propyl) maleamic acid, N-(2-chlorohexyl) maleamic acid, N-methoxymethyl maleamic acid, N-benzyl maleamic acid, N-(2-phenylethyl) maleamic acid, N-(3-phenylpropyl) maleamic acid, N-(4-phenyl-n-butyl) maleamic acid, N-phenyl maleamic acid, N-naphthyl maleamic acid, N-(o-chlorophenyl) maleamic acid, N-(m-bromophenyl) maleamic acid, N-(p-fluorophenyl) maleamic acid, N-(o-iodophenyl) maleamic acid, N-(o-methoxyphenyl) maleamic acid, N-(m-methoxyphenyl) maleamic acid, N-(p-ethoxyphenyl) maleamic acid, N-(p-n-butoxyphenyl) maleamic acid, N-(p-chloro-m-methylphenyl) maleamic acid, N-(o-methylphenyl) maleamic acid, N-(m-methylphenyl) maleamic acid, N-(o-ethylphenyl) maleamic acid, N-(m-ethylphenyl) maleamic acid, N-(p-ethylphenyl) maleamic acid, N-(o-isopropylphenyl) maleamic acid, N-(m-isopropylphenyl) maleamic acid, N-(p-isopropyl phenyl) maleamic acid, N-(o-n-butylphenyl) maleamic acid, N-(m-n-butylphenyl) maleamic acid, N-p-tolyl maleamic acid, N-(4-hydroxyl-1-naphthyl) maleamic acid, and the like.

The term "divalent hydrocarbon radicals" as used herein is intended to encompass both unsubstituted as well as substituted divalent hydrocarbon radicals. Illustrative of suitable radicals are alkylene radicals, such as ethylene, trimethylene, tetramethylene, pentamethylene, hexamethylene, 2-ethyl hexamethylene, octamethylene, nonamethylene, decamethylene, and the like; the cycloaliphatic radicals, such as 1,4-cyclohexane, 1,3-cyclohexane, 1,2-cyclohexane, and the like; halogenated alkylene and cycloaliphatic radicals, such as 2-chloroethylene, 2-bromoethylene, 2-fluoroethylene, 2-iodoethylene, 2-chlorotrimethylene, 2-bromotrimethylene, 2-chloropentamethylene, 3-chlorohexamethylene, 2-chloro-octamethylene, and the like; alkoxy and aryloxy substituted alkylene and cycloaliphatic radicals, such as methoxymethylene, ethoxymethylene, ethoxyethylene, 2-ethoxytrimethylene, 3-ethoxypentamethylene, 1,4-(2-methoxycyclohexane), 2-phenoxyethylene, 2-phenoxytrimethylene, 1,3-(2-phenoxycyclohexane), and the like; aralkylene radicals, such as 2-phenylethylene, 2-phenyltrimethylene, 1-phenylpentamethylene, 2-phenyldecamethylene, and the like; aromatic radicals, such as phenylene, naphthylene, and the like; halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like; alkyl substituted aromatic radicals, such as 1,4-(2-methylphenylene), 1,4-(2-ethylphenylene), 1,4-(2-n-propylphenylene), 1,4-(2-n-butylphenylene) 1,4-(2-n-dodecylphenylene), and the like.

Among N-substituted maleamic acids wherein R in the formula previously noted is a divalent hydrocarbon radical having as a substituent on its terminal carbon atom a radical having the formula:

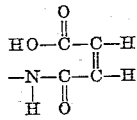

can be noted N,N'-ethylene bis maleamic acid, N,N'-trimethylene bis-maleamic acid, N,N'-tetramethylene bis-maleamic acid, N,N'-decamethylene bis-maleamic acid, N,N'-1,4-cyclohexane bis-maleamic acid, N,N'-2-chlorotrimethylene bis-maleamic acid, N,N'-2-bromotrimethylene bis-maleamic acid, N,N'-2-chlorotetramethylene bis-maleamic acid, N,N'-3-chlorohexamethylene bis-maleamic acid, N,N'-2-ethoxytetramethylene bis-maleamic acid, N,N'-2-ethoxytetramethylene bis-maleamic acid, N,N'-1,4-(2-methoxycyclohexane) bis-maleamic acid, N,N'-phenoxyethylene bis-maleamic acid, N,N'-2-phenoxytrimethylene bis-maleamic acid, N,N'-1,4-(2-phenoxycyclohexane) bis-maleamic acid, N,N'-1,4-(2-nitrocyclohexane) bis-maleamic acid, N,N'-phenylmethylene bis-maleamic acid, N,N'-phenylethylene bis-maleamic acid, N,N'-2-phenyltrimethylene bis-maleamic acid, N,N'-2-phenyltetramethylene bis-maleamic acid, N,N'-1-phenyldodecamethylene bis-maleamic acid, N,N'-1,4-phenylene bis-maleamic acid, N,N'-1,5-naphthalene bis-maleamic acid, N,N'-1,4-(2-chlorophenylene) bis-maleamic acid, N,N'-1,4-(2-bromophenylene) bis-maleamic acid, N,N'-1,4-(2-methoxyphenylene) bis-maleamic acid, N,N'-1,4-(2-ethoxyphenylene) bis-maleamic acid, N,N'-1,4-(2-phenoxyphenylene) bis-maleamic acid, N,N'-1,4-(2-methylphenylene) bis-maleamic acid, N,N'-1,4-(2-ethylphenylene) bis-maleamic acid, N,N'-1,4-(2-n-propylphenylene) bis-maleamic acid, N,N'-4,4'-(diphenyl ether) bis-maleamic acid, N,N'-1,4'(2-n-dodecylphenylene) bis-maleamic acid, N,N'-4,4'-benzophenone bis-maleamic acid, and the like.

Particularly desirable compounds for purposes of this invention are those wherein R is either a monovalent or divalent radical as previously described having a maximum of 20 carbon atoms and being free of interfering groups, such as —COOH and NH$_2$.

Among suitable tertiary amines for purposes of this invention are those having the general formula:

$$(R')_3N$$

wherein R' is a hydrocarbon radical free of ethylenic and acetylenic unsaturation. Illustrative of suitable radicals for R' can be noted methyl, ethyl n-propyl, isopropyl, n-butyl, n-amyl, n-hexyl, 2-ethyl-n-hexyl, n-heptyl, n-octyl, n-nonyl, n-dodecyl, benzyl, 2-phenylethyl, 3-phenyl-n-propyl, 4-phenyl-n-butyl, 5-phenyl-n-amyl, 2-phenyl-n-hexyl, 3-phenyl-n-heptyl, phenyl, o-methylphenyl, p-ethylphenyl, p-amylphenyl, o-n-butylphenyl, and the like. Specific compounds include, among others, trimethylamine, triethylamine, tri-n-propylamine, tri-n-butylamine, tri-n-amylamine, tri-(2-ethyl-n-hexyl) amine, tri-n-dodecylamine, tri-(2-phenylethyl) amine, tribenzylamine, dimethyl propylamine, dimethyl-n-propylamine, methyl ethyl-n-propylamine, N,N'-dimethyl aniline, and the like. Particularly desirable compounds are those wherein the R' is either an alkyl or an aralkyl radical having a maximum of 20 carbon atoms.

Suitable anhydrides of saturated lower fatty acids which can be used in the process of the present invention are ketene, acetic anhydride, propionic anhydride, and butyric anhydride.

The reaction involved in the preparation of an N-substituted maleimide in accordance with the present invention can be illustrated by the following equation, identified as Equation I:

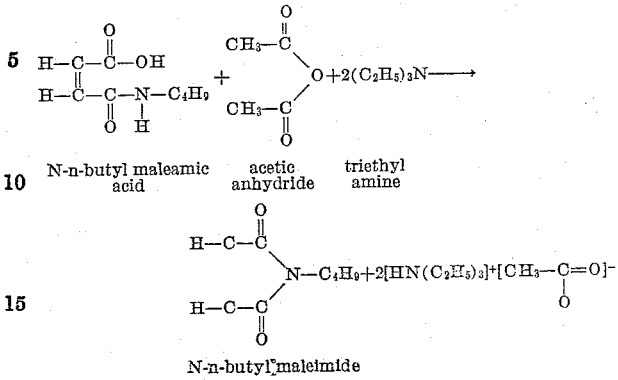

N-n-butyl maleamic acid    acetic anhydride    triethyl amine

N-n-butyl maleimide

Various amounts of the starting materials can be used for purposes of the present invention. Generally from about a stoichiometric amount to about 20 times the stoichiometric amount of an anhydride of a saturated lower fatty acid can be used. Using more than about 20 times the stoichiometric amount does not materially increase the yield of N-substituted maleimide and is economically unattractive. For purposes of stoichiometric calculations, one molecule of an anhydride of a lower fatty acid is deemed to react with one —COOH group of the N-substituted maleamic acid. A mole ratio of about 2 to about 10 moles of an organic tertiary amine per mole of the N-substituted maleamic acid is satisfactory for purposes of the present invention. More than 10 moles of an organic tertiary amine per mole of N-substituted maleamic acid can be used if desired. Using more than about 10 moles per mole of the acid does not materially increase the yield of N-substituted maleimide and is therefore economically undesirable.

The temperature at which the N-substituted maleamic acid can be cyclodehydrated can vary over a wide range, from about room temperature, i.e., about 25° C. to a temperature below the decomposition point of the reactants and of the maleimide product formed. At temperatures lower than about 25 C., the reaction procedes sluggishly.

It is also preferred to conduct the cyclodehydration reaction in the presence of an organic diluent which is a solvent for the starting material and is non-reactive with the starting materials and the final product. Using an organic diluent facilitates recovery of the N-substituted maleimide from the reaction mixture.

The actual organic diluent used will depend upon the starting materials and the temperature at which the reaction is to be conducted. The organic diluent should have a boiling point above the reaction temperature. It is customary to use the organic diluent in amounts of at least about 50% by weight based on the weight of the starting materials. The upper limit with respect to the amount of organic diluent used will depend upon the rate at which it is desired to conduct the reaction. The more dilute the recation mixture, the slower the rate of reaction. From a practical standpoint, the organic diluent is used in amounts up to about 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbon, such as dichloromethane, 1,2-dichloroethane, and the like; ethers, such as petroleum ether, diethyl ether, diethyl ether of ethylene glycol, diethyl ether of 1,3-propylene glycol, dioxane, and the like; aliphatic ketones, such as acetone, methyl ethyl ketone, and the like; also suitable is dimethyl formamide, and the like.

The cyclodehydration of N-substituted maleamic acids is conducted, generally, under atmospheric pressure, although if desired, the reaction can be conducted under subatmospheric or superatmospheric pressure.

The process of the present invention is conducted by simply admixing the N-substituted maleamic acid, the organic tertiary amine and the anhydride of a saturated lower fatty acid. The cyclodehydration of the N-substituted maleamic acid is practically instantaneous in that some N-substituted maleimide is formed immediately upon admixing of the necessary starting materials. It is customary, however, to allow the reaction mixture to stand for at least one hour in order to insure that the reaction has proceeded to completion.

Recovery of N-substituted maleimides from the reaction mixture can be accomplished by any one of a number of convenient methods. For example, in those instances wherein there is no diluent present in the reaction mixture or if a diluent is present, it is miscible with water, the reaction mixture can be poured into water with the result that the N-substituted maleimide separates out of the resultant water mixture. If the N-substituted maleimide is a solid, it can then be recovered by a simple filtration operation and then, if desired, recrystallized from suitable liquids, such as the organic liquids previously noted in this specification as organic diluents. If the N-substituted maleimide is a liquid, it can then be removed from the resultant water-mixture by extraction using a suitable organic solvent and recovered by evaporation of the solvent.

In those instances wherein the organic diluent is immiscible with water, the N-substituted maleimide formed is recovered by simply evaporating off the organic diluent.

If desired, the N-substituted maleimide can also be washed with aqueous solutions of sodium bicarbonate, sodium hydroxide, and the like, or passed through a column of Florisil in order to insure removal of unreacted starting materials.

The N-substituted maleamic acid intermediates which can be used in the preparation of the corresponding maleimides in accordance with the present invention can be obtained by reacting, in suitable solvents, approximately equimolar quantities of a primary mono- or primary diamine with maleic anhydride. In producing an N-substituted maleamic acid having the formula previously given wherein R is a monovalent hydrocarbon radical, the following primary mono-amines can be used: methylamine, ethylamine, isopropylamine, n-butylamine, isobutylamine, isoamylamine, n-hexylamine, n-heptylamine, n-octylamine, n-dodecylamine, cyclohexylamine, 2-chloroethylamine, 2-bromoethylamine, 2-fluoroethylamine, 2-iodopropylamine, chlorocyclohexylamine, methoxymethylamine, 2 - phenoxy-n-propylamine, benzylamine, 2-phenethylamine, 3-phenylpropylamine, 4-phenylbutylamine, naphthylamine, p-toluidine, o-p-xylylidine, o-ethylaniline, m-ethylaniline, p-ethylaniline, o-isopropylaniline, m-isopropylaniline, p-isopropylaniline, o-n-butylaniline, m-n-butylaniline, p-n-butylaniline, p-n-octylaniline, o-chloroaniline, n-bromoaniline, p-fluoroaniline, o-iodoaniline, o-methoxyaniline, m-methoxyaniline, p-ethoxyaniline, p-n-butoxyaniline, o-nitroaniline, p-nitroaniline, 4-chloro-3-methylaniline, o-toluidine, m-toluidine, 4-sulfamylaniline, and the like. In producing an N-substituted maleamic acid having the formula previously given wherein R is a divalent hydrocarbon radical, the following diamines can be used: 1,2-diaminoethane, 1,3-diaminopropane, 1,4-diaminobutane, 1,5-diaminopentane, 1,4-phenylene diamine, 4,4'-diaminodiphenylmethane, and the like. Process for producing maleamic acids is further described in the book entitled "Maleic Anhydride Derivatives" by L. A. Flett and W. H. Gardner, incorporated by reference.

The following examples further illustrate the present invention and are not intended to limit the scope thereof in any manner.

EXAMPLE 1

*Preparation of N,N'-hexamethylene bis-maleimide*

Into a Pyrex glass flask equipped with a stirrer, thermometer, dropping funnel, and condenser, there was charged 78 grams (0.25 mole) of N,N'-hexamethylene bis-maleamic acid, 175 ml. (1.7 moles) of acetic anhydride, and 101 grams (1 mole) of triethylamine. Stirring of the mixture was started when all of the materials were charged into the glass flask and the mixture was heated to a temperature of about 90° C. Heating of the mixture was then stopped; the mixture was allowed to cool to 30° C. and then poured into 1 liter of ice water. The solid which precipitated was collected as a filter cake and washed with 1 liter of a 10% by weight aqueous sodium bicarbonate solution. The solid, on being collected, was washed with 1 liter of water and then dried under a vacuum of 30 mm. Hg. pressure. 37.4 grams of product were recovered. The product was identified as N,N'-hexamethylene bis-maleimide by infra-red and melting point comparisons with known samples of N,N-hexamethylene bis-maleimide. A sample of N,N'-hexamethylene bis-maleimide recrystallized from benzene had a melting point of 141° C.–142° C.

EXAMPLE 2

*Preparation of N-n-butyl maleimide*

Into a Pyrex glass flask equipped with a stirrer, thermometer, dropping funnel, and reflux condenser containing 200 ml. of refluxing benzene, there was added 17.3 grams (0.1 mole) of N-n-butyl maleamic acid and 21 grams (0.21 mole) of triethylamine. To this mixture there was then added, dropwise, over a period of 3 or 4 minutes, 10.2 grams (0.1 mole) of acetic anhydride. The resultant mixture was constantly stirred while maintained at reflux for one hour. After refluxing for one hour, the solution was cooled to about 25° C. (room temperature) and washed in a separatory funnel with successive 100 ml. portions of a 10% aqueous sodium hydroxide solution and water. The organic layer recovered from the aqueous layer was subjected to a reduced pressure of 30 mm. Hg., thereby removing the benzene. The residual liquid was distilled at a reduced pressure of 0.5 mm. Hg. and at a temperature of 50° C.–55° C., yielding 10 grams of a clear liquid distillate. The liquid product was identified at N-n-butyl maleimide, as shown by infra-red and vapor phase chromatographic comparisons with known samples of N-n-butyl maleimide.

EXAMPLE 3

*Preparation of N-n-butyl maleimide*

Into a Pyrex glass flask equipped with a stirrer, thermometer, dropping funnel, and reflux condenser and containing 17.3 grams (0.1 mole) of N-n-butyl maleamic acid dissolved in 250 ml. of dichloromethane, there was charged 21 grams (0.21 mole) of triethylamine. The mixture was then cooled to about 0° C. in an ice-salt bath. To the cooled mixture there was then added, dropwise, 10.2 grams (0.1 mole) of acetic anhydride and the mixture allowed to stand for three hours at about 25° C. while being continuously stirred. At the end of three hours, the mixture was washed with 100 ml. of water in a separatory funnel. The organic layer was removed from the aqueous layer, dried over magnesium sulfate, and concentrated by heating at 35° C. under a pressure of 30 mm. Hg. The residue was distilled at 60° C.–65° C. under a pressure of 1–2 mm. Hg, yielding 8.5 grams of a clear liquid distillate. The liquid product was shown to be N-n-butyl maleimide by infra-red and vapor phase chromatographic analysis on comparison with known samples of N-n-butyl maleimide.

EXAMPLE 4

Preparation of N-n-butyl maleimide

Into a Pyrex glass flask equipped with a stirrer, thermometer, dropping funnel and condenser and containing 150 ml. of dichloromethane there was charged 17.3 grams (0.1 mole) of N-n-butyl maleamic acid and 10.1 grams (0.1 mole) of triethylamine. 0.15 mole of gaseous ketene was then bubbled into the reaction mixture at room temperature (about 25° C.) over a period of 20 minutes. The dichloromethane was then removed under reduced pressures and the liquid residue was distilled at a temperature of 55° C.–60° C. under a pressure of 0.7 mm. Hg. 9.5 grams of clear liquid distillate were recovered. This product was identified as N-n-butyl maleimide by infra-red and vapor phase chromatographic analysis in comparison wits a known sample of N-n-butyl maleimide.

EXAMPLE 5

Preparation of N-phenyl maleimide

Into a Pyrex glass flash equipped with a stirrer, thermometer, dropping funnel, and reflux condenser and containing 150 ml. of dicholromethane, there was charged 19.1 grams (0.1 mole) of N-phenyl maleamic acid, 10.2 grams (0.1 mole) of triethylamine. 0.15 mole of gaseous ketene was bubbled into the reaction mixture at room temperature over a period of 30 minutes. The dichloromethane was then removed from the mixture under reduced pressure. The crude solid residue was then washed with 100 ml. of water, then dissolved in 25 ml. of benzene. The benzene solution was then chromatographed on a Florisil column which had been prepared with benzene. The yellow solid N-n-phenyl maleimide thus isolated weighed 10.1 grams. Product had a melting point of 86.5° C.–89.5° C.

The following table lists a number of N-substituted maleimides prepared as well as the conditions under which such maleimides were prepared.

| N-substituted maleimide | Organic Diluent | Anhydride | Organic Tertiary Amine | Percent Yield | Melting Point or Boiling Point | Procedure and Amount of Material Used |
|---|---|---|---|---|---|---|
| N-N'-hexamethylene bis-maleimide | dichloromethane. | ketene | triethylamine | 17 | 130°–141° C. (M.P.) | Described in Ex. 6. |
| N-phenyl maleimide | benzene | acetic anhydride. | do | 89 | 86.5°–89.5° C. (M.P.) | Described in Ex. 2. |
| N,N' -4,4'-(diphenylmethane) bis-maleimide | do | do | do | 79 | 150° C. (M.P.) | Do. |
| NN'-hexamethylene bis-maleimide | do | do | do | 35.5 | 129°–133° C. (M.P.) | Described in Ex. 4. |
| Do | do | do | do | 29 | 129°–133° C. (M.P.) | Described in Ex. 4 with the exception that 0.2 mole of acetic anydydide was used. |

What is claimed is:

1. Process for the preparation of an N-substituted maleimide which comprises admixing an N-substituted maleamic acid of the formula:

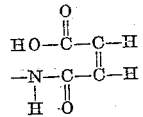

wherein R is selected from the group consisting of a monovalent hydrocarbon radical and a divalent hydrocarbon radical having as a substituent on its terminal carbon atom a radical of the formula:

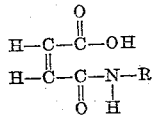

with at least about 2 moles of an organic tertiary amine of the formula $(R')_3N$ wherein R' is a hydrocarbon radical free of ethylenic and acetylenic unsaturation, per mole of said maleamic acid and with at least about a stoichiometric amount of an anhydride of a saturated lower fatty acid, said acid having a maximum of four carbon atoms, for a period of time sufficient to produce the corresponding N-substituted maleimide.

2. Process as defined in claim 1 wherein the said anhydride is ketene.

3. Process as defined in claim 1 wherein the said anhydride is acetic anhydride.

4. Process as defined in claim 1 wherein the said amine is triethylamine.

5. Process as defined in claim 1 wherein the said maleamic acid is N,N'-hexamethylene bis-maleamic acid.

6. Process as defined in claim 1 wherein the said maleamic acid is N-n-butyl maleamic acid.

7. Process as defined in claim 1 wherein the said maleamic acid is N-phenyl maleamic acid.

8. Process as defined in claim 1 wherein the said maleamic acid is N,N'-(4,4'-diphenylmethane) bis-maleamic acid.

9. Process for the preparation of an N-substituted maleimide which comprises admixing in an organic diluent an N-substituted maleimic acid of the formula:

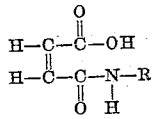

wherein R is selected from the group consisting of a monovalent hydrocarbon radical and a divalent hydrocarbon radical having as a substituent on its terminal carbon atom a radical of the formula:

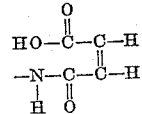

with from about 2 moles to about 10 moles of an organic tertiary amine of the formula $(R')_3N$ wherein R' is a hydrocarbon radical free of ethylenic and acetylenic unsaturation, per mole of said maleamic acid and with from about a stoichiometric amount to about 20 times in excess of the stoichiometric amount of an anhydride of a saturated lower fatty acid, said acid having a maximum of four carbon atoms, for a period of time sufficient to produce the corresponding N-substituted maleimide.

10. Process as defined in claim 1 wherein the admixing is conducted at a temperature in the range of about 25° C. to a temperature below the decomposition point of the starting materials and the N-substituted maleimide formed.

References Cited in the file of this patent

UNITED STATES PATENTS 2,643,258    Miller et al. _____ June 23, 1953